United States Patent
Morovic et al.

(10) Patent No.: US 9,609,177 B2
(45) Date of Patent: Mar. 28, 2017

(54) TO GENERATE A PRINT SPECIFICATION COLOR SEPARATION LOOK-UP TABLE

(71) Applicant: Hewlett-Packard Development Company, L.P., Houston, TX (US)

(72) Inventors: Jan Morovic, Colchester (GB); Peter Morovic, Sant Cugat del Valles (ES); Juan Manuel García Reyero Viñas, Sant Cugat del Valles (ES); Martí Rius Rossell, Sant Cugat del Valles (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/763,152

(22) PCT Filed: Jan. 29, 2013

(86) PCT No.: PCT/EP2013/051629
§ 371 (c)(1),
(2) Date: Jul. 23, 2015

(87) PCT Pub. No.: WO2014/117804
PCT Pub. Date: Aug. 7, 2014

(65) Prior Publication Data
US 2015/0365565 A1  Dec. 17, 2015

(51) Int. Cl.
*H04N 1/60* (2006.01)

(52) U.S. Cl.
CPC .......... *H04N 1/6058* (2013.01); *H04N 1/603* (2013.01); *H04N 1/6008* (2013.01)

(58) Field of Classification Search
None
See application file for complete search history.

(56) References Cited

U.S. PATENT DOCUMENTS

| | | | |
|---|---|---|---|
| 5,734,745 A | 3/1998 | Ohneda | |
| 6,340,975 B2 | 1/2002 | Marsden et al. | |
| 6,388,674 B1 * | 5/2002 | Ito | H04N 1/6058 345/589 |
| 2005/0259109 A1 | 11/2005 | Stokes | |

(Continued)

FOREIGN PATENT DOCUMENTS

| | | |
|---|---|---|
| EP | 0961488 | 12/1999 |
| JP | 2009-506727 | 8/2005 |

(Continued)

OTHER PUBLICATIONS

Chen, Yongda, et al. "A multi-ink color-separation algorithm maximizing color constancy." Color and Imaging Conference. vol. 2003. No. 1. Society for Imaging Science and Technology, 2003.

(Continued)

*Primary Examiner* — Christopher D Wait
(74) *Attorney, Agent, or Firm* — HP Inc.—Patent Department

(57) ABSTRACT

In a method to generate a print specification color separation look-up table, a device color space is sampled to provide at least one sampled value. The sampled value is transformed to a device independent color space. The transformed sampled value is gamut mapped using a source color gamut and a color separation color gamut to provide a color separation value. The gamut mapping is performed in an expansion mode and a compression mode.

20 Claims, 3 Drawing Sheets

(56) References Cited

U.S. PATENT DOCUMENTS

| | | | | |
|---|---|---|---|---|
| 2008/0123164 | A1* | 5/2008 | Suzuki | H04N 1/6058 358/518 |
| 2010/0214576 | A1* | 8/2010 | Morovic | H04N 1/6016 358/1.9 |
| 2011/0063632 | A1* | 3/2011 | Klassen | H04N 1/54 358/1.9 |
| 2013/0076763 | A1* | 3/2013 | Messmer | H04N 1/6058 345/506 |

FOREIGN PATENT DOCUMENTS

| | | |
|---|---|---|
| JP | 2008-022140 | 1/2008 |
| JP | 2009-071618 | 4/2009 |
| KR | 10-2005-0117839 | 12/2005 |
| WO | WO2011/156074 | 6/2010 |

OTHER PUBLICATIONS

Emmel, P. et al., "Colour calibration for colour reproduction," Circuits and Systems, 2000. Proceedings. ISCAS 2000 Geneva. The 2000 I EEE International Symposium on May 28-31, 2000, Piscataway, NJ, USA ,IEEE, vol. 5, May 28, 2000 (May 28, 2000), pp. 105-108.

International Search Report, European Patent Office, Sep. 12, 2013, PCT Patent Application No. PCT/EP2013/051629, 4 pages.

Kim, Yun Tae, et al. "Color look-up table design for gamut mapping and color space conversion." DPP2003: IS&T's International Conference on Digital Production Printing and Industrial Applications. 2004.

Lee, Cheol-Hee, et al. "Color space conversion via gamut-based color samples of printer." Journal of Imaging Science and Technology 45.5 (2001): 427-435.

MacDonald, L. W., "Developments in colour management systems," Displays Devices, Dempa Publications, Tokyo, JP, vol. 16, No. 4, May 1, 1996 (May 1, 1996), pp. 203-211.

* cited by examiner

TO GENERATE A PRINT SPECIFICATION COLOR SEPARATION LOOK-UP TABLE

CROSS-REFERENCE TO RELATED APPLICATION

This application is a U.S. National Stage Application of and claims priority to International Patent Application No. PCT/EP2013/051629, filed on Jan. 29, 2013, and entitled "TO GENERATE A PRINT SPECIFICATION COLOR SEPARATION LOOK-UP TABLE," which is hereby incorporated by reference in its entirety.

BACKGROUND

Printing apparatus, such as inkjet printers, usually comprise a plurality of ink cartridges that may be used by the printing apparatus to apply ink to media such as paper. As the printing apparatus uses the ink in the cartridges the amount of ink in the cartridges decreases. Color separation provides a mapping between printable colors and the amount of ink or Neugebauer Primary area coverage (NPAC).

BRIEF DESCRIPTION

Reference will now be made by way of example only to the accompanying drawings in which.

DETAILED DESCRIPTION

Figure 1:
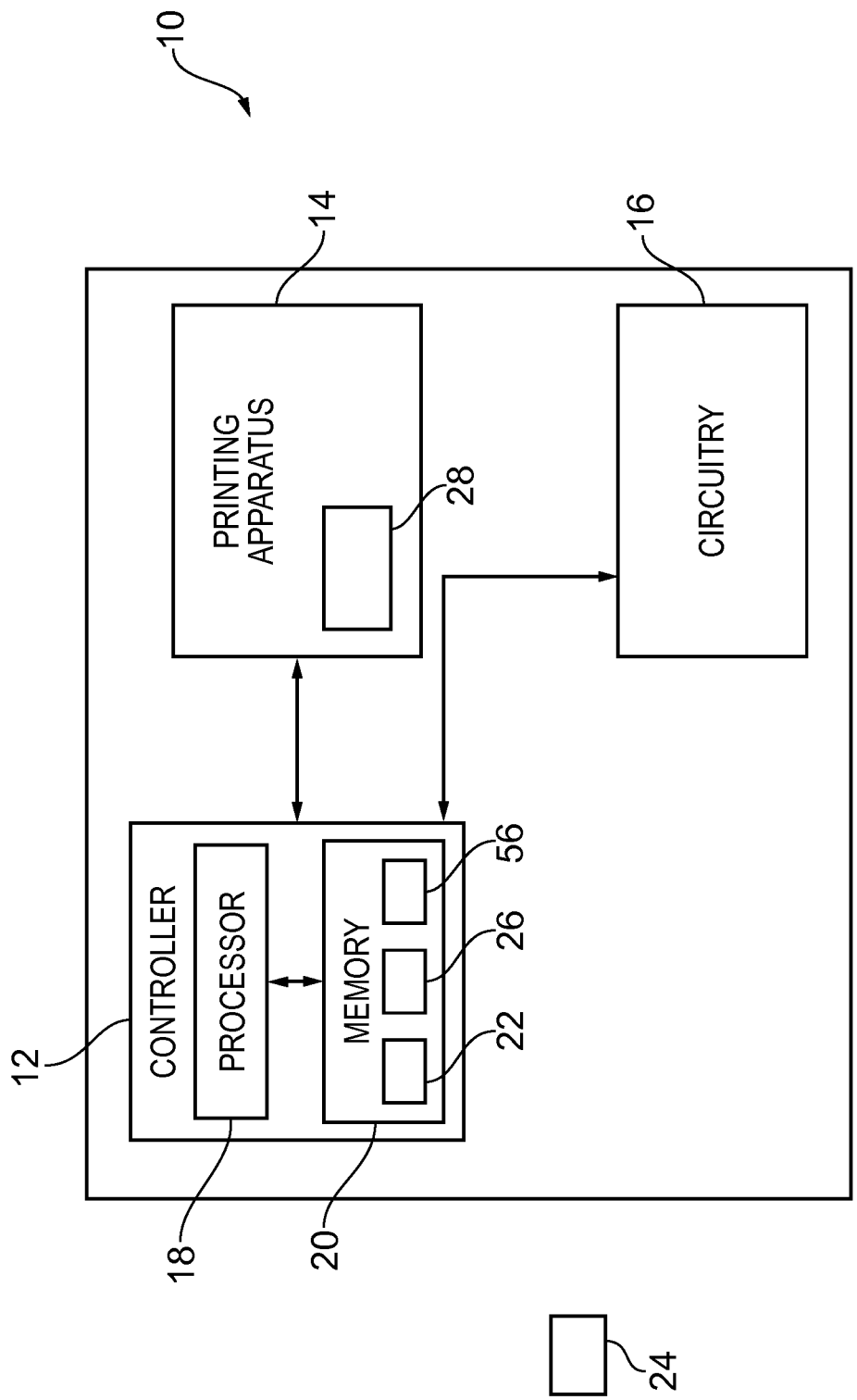
FIG. 1 illustrates a schematic diagram of an apparatus according to an example.

FIG. 1 illustrates a schematic diagram of an apparatus 10 (which may also be referred to as a printing system) including a controller 12, printing apparatus 14 and circuitry 16. The apparatus 10 may be a unitary device where the controller 12, the printing apparatus 14 and the circuitry 16 are housed in a single housing. In other examples, the apparatus 10 may include a plurality of physically separate devices each having their own housing (for example, the controller 12 and the circuitry 16 may be a physically separate device to the printing apparatus 14). In further examples, the apparatus 10 may be a module. As used here, 'module' refers to a unit or apparatus that excludes certain parts/components that would be added by an end manufacturer or a user. For example, where the apparatus 10 is a module, the apparatus 10 may only include the controller 12.

The implementation of the controller 12 can be in hardware alone (for example, a circuit, a processor and so on), have certain aspects in software including firmware alone or can be a combination of hardware and software (including firmware).

The controller 12 may be implemented using instructions that enable hardware functionality, for example, by using executable computer program instructions in a general-purpose or special-purpose processor 18 that may be stored on a computer readable storage medium 20 (disk, memory and so on) to be executed by such a processor 18.

The processor 18 is configured to read from and write to the memory 20. The processor 18 may also comprise an output interface via which data and/or commands are output by the processor 18 and an input interface via which data and/or commands are input to the processor 18.

The memory 20 stores a computer program 22 comprising computer program instructions that control the operation of the apparatus 10 when loaded into the processor 18. The computer program instructions 22 provide the logic and routines that enables the apparatus 10 to perform the method illustrated in FIG. 2. The processor 18 by reading the memory 20 is able to load and execute the computer program 22.

The computer program 22 may arrive at the apparatus 10 via any suitable delivery mechanism 24. The delivery mechanism 24 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 22. The delivery mechanism 24 may be a signal configured to reliably transfer the computer program 22. The apparatus 10 may propagate or transmit the computer program 22 as a computer data signal.

The memory 20 also stores a color to print specification look-up table (LUT) 26. The color to print specification look-up table 26 maps color separation values (i.e. colorimetric data) with Neugebauer Primary area coverage (NPac) or ink vectors.

Although the memory 20 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware.

The printing apparatus 14 may be any suitable color printing apparatus and may be, for example, a color inkjet printer, a color laser printer or a color solid ink printer. The printing apparatus 14 includes a plurality of color cartridges 28 that include color printing material such as ink (for example, cyan, magenta, yellow and black (CMYK) ink). The controller 12 is arranged to control the operation of the printing apparatus 14. For example, the controller 12 may control the printing apparatus 14 to print color ink from the color cartridges 28 onto a sheet or web of media.

The circuitry 16 includes further components of the apparatus 10 and may include, for example, a display, a user input device and communication circuitry (such as radio frequency circuitry to enable wireless communication). The controller 12 is coupled to the circuitry 16 and is arranged to enable the circuitry 16 to function. For example, where the circuitry 16 includes a display, the controller 12 is arranged to control the display to display text and/or graphics.

The operation of the apparatus 10 is described in the following paragraphs with reference to FIG. 2.

At block 30, the controller 12 samples a device color space to provide at least one sampled value. For example, the controller 12 may sample a device red, green, blue (dRGB) cube color space of the printing apparatus 14 to provide a plurality of dRGB sampled values. By way of another example, the controller 12 may sample a device cyan, magenta, yellow, black (dCMYK) color space of the printing apparatus 14 to provide a plurality of dCMYK sampled values. The sampling performed by controller 12 may be a regular $17^3$ sampling or a regular $33^3$ sampling for example.

At block 32, the controller 12 transforms the at least one sampled value from block 30 to a device independent color space. For example, the controller 12 may transform a plurality of dRGB sampled values to the International Commission on Illumination LAB (CIELAB) color space using an International Color Consortium (ICC) profile of a chosen source color space. For example, the chosen source color space may be sRGB or Adobe RGB.

At block 34, the controller 12 may transform the at least one transformed sampled value from block 32 to a color space that is more optimal (that is, better suited) for color gamut mapping than the device independent color space of block 32. For example, the controller 12 may transform the CIELAB color space sampled values from block 32 to the CIECAMO2 color space or to the IPT color space.

At block 36, the controller 12 performs gamut mapping on the transformed sampled value from block 34 (or on the transformed sampled value from block 32 if block 34 is not performed by the controller 12) using a source color gamut and the color separation color gamut to provide a color separation value.

The controller 12 initially computes at block 36 the color gamut of the source ICC profile of the chosen source color space and of the colors indexing the color to print specification color separation. The result of this computation describes the range of colors initially assigned to the device color space sampling (performed in block 30) and the range of colors it needs to have to address the color separation requiring the device color space (e.g. dRGB) interface. In other words, the controller 12 starts with the device color space (a dRGB cube for example). By assigning the chosen source color space with an almost arbitrary source ICC profile (sRGB for example), whose gamut the controller 12 computes, and computing the gamut of the colors that index the color separation, the controller 12 then proceeds to the following gamut mapping, which will result in a link between the initial colors assigned to the device color space (dRGB having sRGB assigned for example) and the actual color separation colors that they need to address.

The controller 12 performs gamut mapping in an expansion mode and in a compression mode. The expansion mode and the compression mode are described in the following paragraphs with reference to FIGS. 3 and 4.

Figure 3:
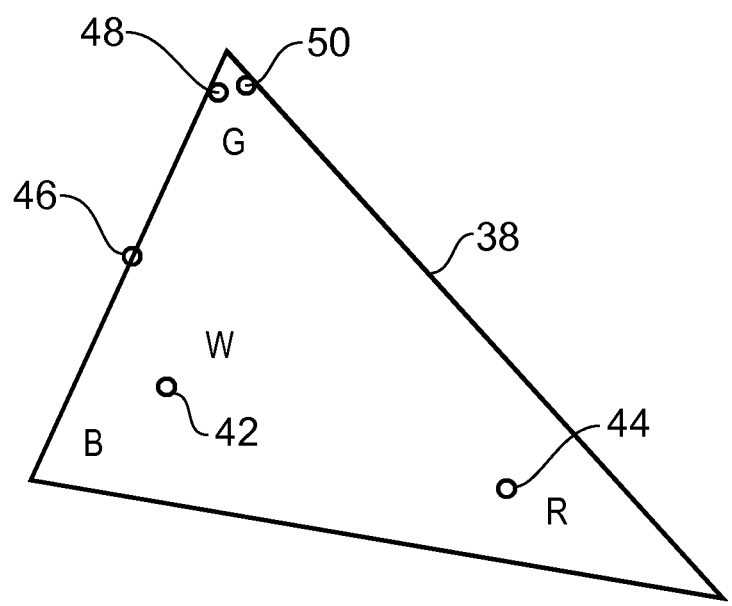
FIG. 3 illustrates a source color gamut of a device color space according to an example.

FIG. 3 illustrates a source color gamut 38 according to an example. The source color gamut 38 is triangular in shape. The color white is located at the centre of the color gamut 38, the color blue is located at the left corner of the color gamut 38, the color red is located at the right corner of the color gamut 38, and the color green is located at the top corner of the color gamut 38.

Figure 4:
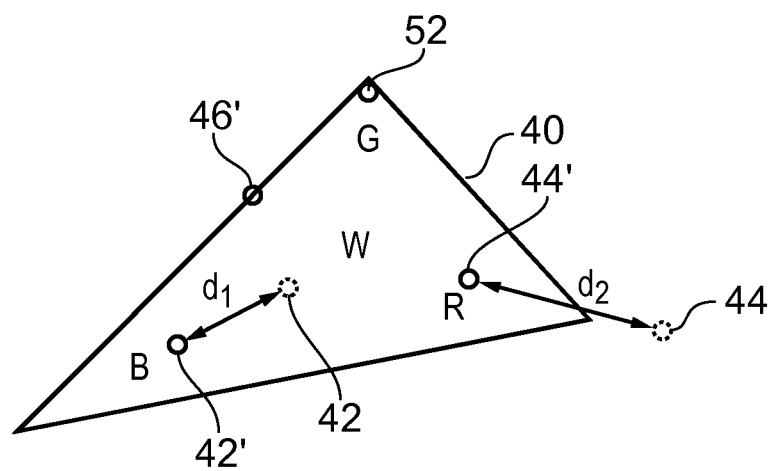
FIG. 4 illustrates a color separation color gamut of a color separation color space according to an example.

FIG. 4 illustrates a color separation color gamut 40 according to an example. The color separation color gamut 40 is also triangular, but has a different shape and area to the triangle of the source color gamut 38 illustrated in FIG. 3. The color white is located at the centre of the color gamut 40, the color blue is located at the left corner of the color gamut 40, the color red is located at the right corner of the color gamut 40, and the color green is located at the top corner of the color gamut 40. The green and red corners of the color gamut 40 lie within the green and red corners of the color gamut 38. The blue corner of the color gamut 40 lies outside of the blue corner of the color gamut 38.

In the expansion mode, parts of the source color gamut that are inside the color separation color gamut are expanded to reach the color separation color gamut. For example, the color at position 42 (a relatively light blue) in the source color gamut 38 illustrated in FIG. 3 is expanded to position 42' in the color separation color gamut 40 illustrated in FIG. 4 by the gamut mapping by a distance $d_1$.

In the compression mode, parts of the source color gamut that are outside of the color separation color gamut are compressed to fall within the color separation color gamut. For example, the color at position 44 (a relatively bright saturated red) in the source color gamut 38 illustrated in FIG. 3 is compressed to position 44' in the color separation color gamut 40 illustrated in FIG. 4 by the gamut mapping by a distance $d_2$.

In some examples, the gamut mapping includes using a flag indicative of a surface boundary of the device color space to map a sampled value on the surface boundary of the device color space to a surface boundary of the color separation color space. For example, the color at position 46 is on the surface boundary of the device color gamut 38 between green and blue. The controller 12 receives a flag when the sampled value at position 46 is gamut mapped that indicates that the sampled value is on the surface boundary of the source color gamut 38. Subsequently, the controller 12 gamut maps the sampled value to position 46' on the surface boundary of the color separation color gamut 40 illustrated in FIG. 4 (that is, the controller 12 uses the flag to snap the sampled value to the surface boundary of the color separation color gamut 40).

In some examples, the gamut mapping includes applying a hue shift to a sampled value near a surface boundary of the device color space to obtain a peak color separation value. For example, the color at position 48 is located near, but not at, the top corner of the source color gamut 38 and similarly, the color at position 50 is located near, but not at, the top corner of the source color gamut 38. Due to the sampling density performed in block 30, the colors at positions 48, 50 represent the closest sampling to the color positioned at the top corner of the source color gamut 38 (that is, the most saturated and brightest green). While gamut mapping, the controller 12 applies a hue shift to the color at position 48 or to the color at position 50 to obtain the color separation value at position 52 in FIG. 4. The color separation value at position 52 is located at the top corner of the color separation color gamut 40 and is the most saturated and brightest green within the color separation color gamut 40.

Where the device color space is cyan, magenta, yellow, black (CMYK), the controller 12 is arranged to perform gamut mapping repeatedly for a plurality of different levels of black. Once this has been completed, the controller 12 concatenates the color separation values for the different levels of black.

At block 54, the controller 12 concatenates the sampled values and the associated color separation values from block 36 with the color to print specification look-up table 26 to provide a device color space to print specification look-up table 56. For example, where the device color space is dRGB, the execution of the method illustrated in FIG. 2 provides a dRGB to print specification look-up table. The device color space to print specification look-up table 56 may be stored by the controller 12 in the memory 20 for later use.

The above described method is advantageous in that it provides a device color space (e.g. dRGB) to print specification look-up table that has a relatively smooth color output. In particular, the method allows for smoothly varying inputs to preserve their smoothness in the output. Furthermore, the method may advantageously enable the addressing of the full color gamut of the device color space.

The method may also be advantageous in that an ICC profile may be selected for the device. For example, choosing standard red, green and blue (sRGB) would yield a device RGB interface that is similar to sRGB by design and for some applications (Microsoft Office for example) would not require color management and which may make color workflows simpler.

Figure 2:
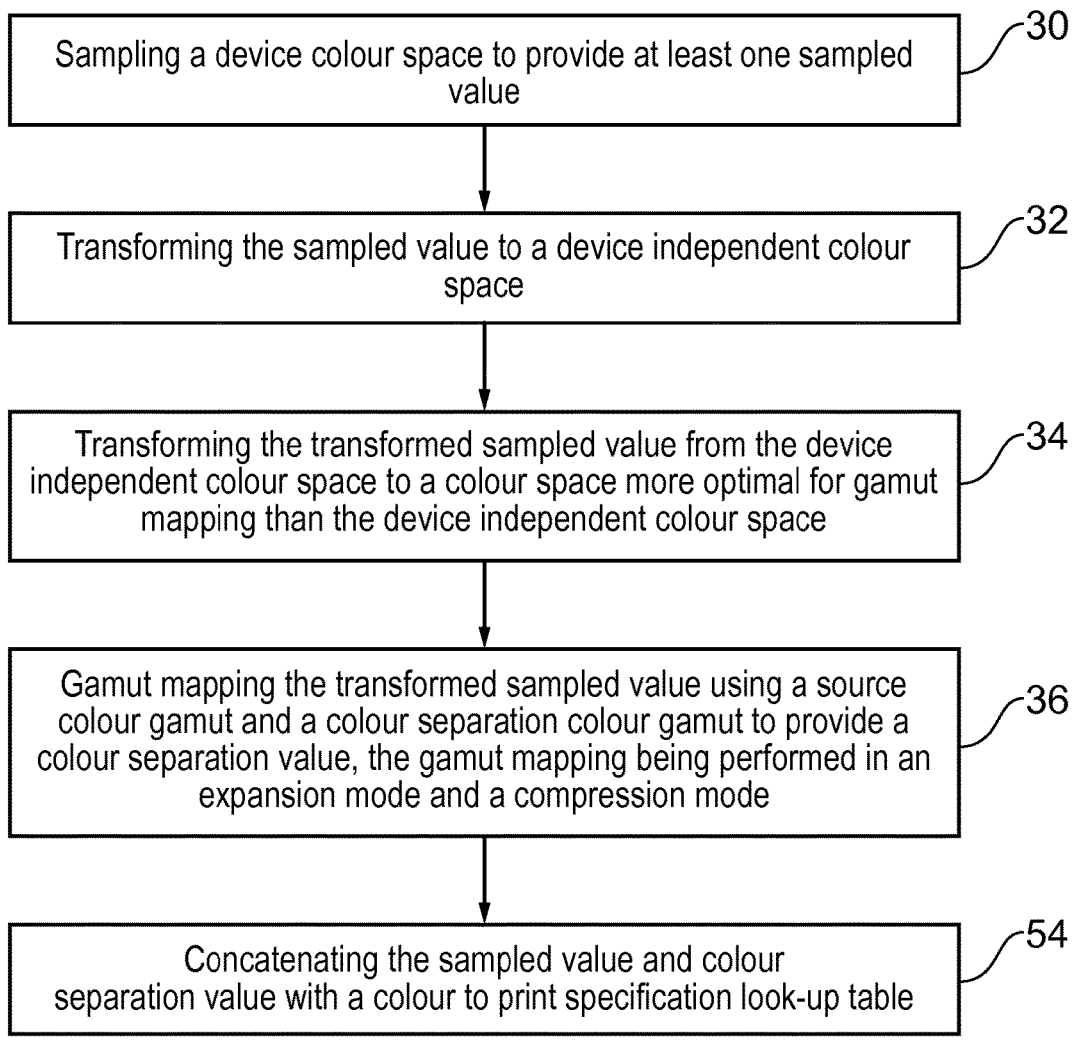
FIG. 2 illustrates a flow diagram of a method to generate a print specification color separation look-up table according to an example.

The blocks illustrated in the FIG. 2 may represent steps in a method and/or sections of code in the computer program 22. The illustration of a particular order to the blocks does not necessarily imply that there is a required or preferred order for the blocks and the order and arrangement of the blocks may be varied. Furthermore, it may be possible for some blocks to be omitted.

Although examples of the present invention have been described in the preceding paragraphs, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    sampling, by a system comprising a processor, a device color space to provide sampled color values in the device color space;
    transforming, by the system, the sampled color values to a device independent color space;
    gamut mapping, by the system, the transformed sampled color values using a source color gamut and a color separation color gamut as inputs to output color separation values, the gamut mapping being performed in an expansion mode and a compression mode, and the gamut mapping producing a link between the sampled color values of the device color space and the color separation values that span the color separation color gamut; and
    using, by the system, a result of the gamut mapping to produce a color output by a printing apparatus.

2. A method as claimed in claim 1, wherein the gamut mapping includes using a flag indicative of a surface boundary of the device color space to map a sampled color value on the surface boundary of the device color space to a surface boundary of the color separation color gamut.

3. A method as claimed in claim 1, wherein the gamut mapping includes applying a hue shift to a sampled color value near a surface boundary of the device color space to obtain a peak color separation value.

4. A method as claimed in claim 1, further comprising:
    concatenating, by the system, the sampled color values and the color separation values with a color to print specification look-up table to produce a device color space to print specification look-up table.

5. A method as claimed in claim 1, further comprising transforming the transformed sampled color values from the device independent color space to a color space more optimal for the gamut mapping than the device independent color space.

6. A method as claimed in claim 1, wherein the device color space is a device red, green, blue (dRGB) color space.

7. A method as claimed in claim 1, wherein the device color space is a cyan, magenta, yellow, black (CMYK) color space.

8. A method as claimed in claim 7, wherein the gamut mapping is performed for each black level of a plurality of different levels of black to produce respective color separation values, and the method further comprises concatenating the color separation values for the plurality of different levels of black.

9. An apparatus comprising:
    a controller to:
        sample a device color space to provide sampled color values in the device color space;
        transform the sampled color values to a device independent color space;
        gamut map the transformed sampled color values using a source color gamut and a color separation color gamut as inputs to provide color separation values as output, the gamut mapping being performed in an expansion mode and a compression mode, and the gamut mapping producing a link between the sampled color values of the device color space and the color separation values corresponding to the color separation color gamut; and
        use a result of the gamut mapping to produce a color output by a printing apparatus.

10. An apparatus as claimed in claim 9, wherein the controller is to use a flag indicative of a surface boundary of the device color space to map a sampled color value on the surface boundary of the device color space to a surface boundary of the color separation color gamut.

11. An apparatus as claimed in claim 9, wherein the controller is arranged to apply a hue shift to a sampled color value near a surface boundary of the device color space to obtain a peak color separation value.

12. An apparatus as claimed in claim 9, wherein the controller is to generate a print specification look-up table by concatenating the sampled color values and the color separation values with a color to print specification look-up table.

13. An apparatus as claimed in claim 9, wherein the device color space is a cyan, magenta, yellow, black (CMYK) color space, and the controller is to:
perform the gamut mapping for each black level of a plurality of different levels of black; and
concatenate the color separation values for the plurality of different levels of black.

14. A non-transitory computer-readable storage medium encoded with instructions that when executed, cause a controller comprising a processor to:
sample a device color space to provide sampled color values in the device color space;
transform the sampled color values to a device independent color space;
gamut map the transformed sampled color values using a source color gamut and a color separation color gamut as inputs to output color separation values, the gamut mapping being performed in an expansion mode and a compression mode, and the gamut mapping producing a link between the sampled color values of the device color space and the color separation values corresponding to the color separation color gamut;
generate a look-up table using the color separation values; and
use the look-up table to produce a color output by an output device.

15. A method as claimed in claim 1, wherein the color separation color gamut is different from the source color gamut.

16. A method as claimed in claim 15, wherein the color separation color gamut is a gamut of colors that index a color separation, the color separation providing a mapping between printable colors and the amount of ink or Neugebauer Primary area coverage (NPAC).

17. A method as claimed in claim 15, wherein the gamut mapping performed in the expansion mode expands a given color in the source color gamut to a color in the color separation color gamut, wherein the given color in the source color gamut is also in the color separation color gamut.

18. A method as claimed in claim 15, wherein the gamut mapping performed in the compression mode compresses a given color in the source color gamut outside the color separation color gamut to a color in the color separation color gamut.

19. An apparatus as claimed in claim 9, wherein the color separation color gamut is different from the source color gamut.

20. A non-transitory computer-readable storage medium as claimed in claim 14, wherein the instructions when executed cause the controller to:
concatenate the sampled color values and the color separation values with a first look-up table to generate the generated look-up table.

* * * * *